MAGNETIC TAPE EDITING MACHINE
Filed Oct. 22, 1965
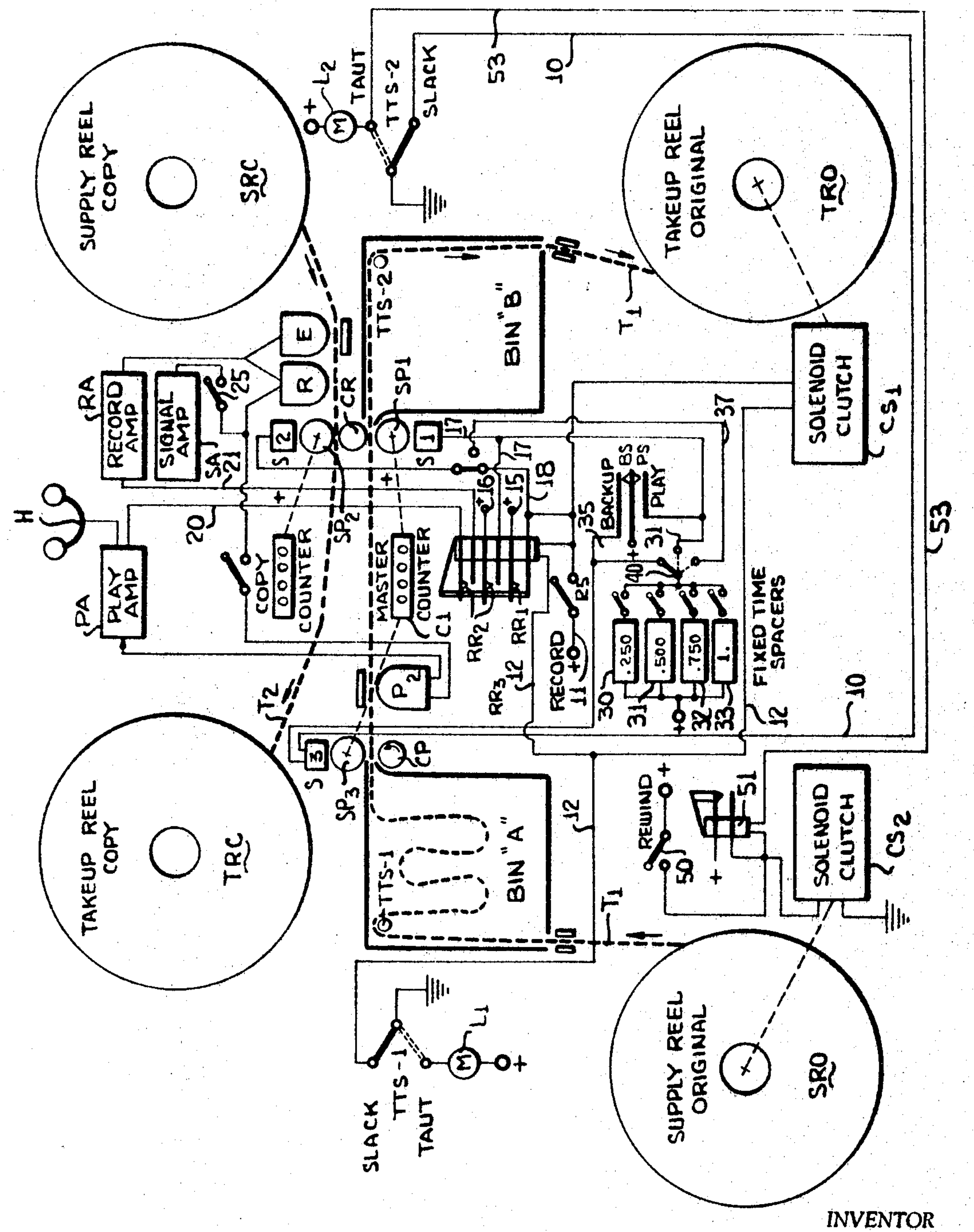
INVENTOR
JAMES N. COOPER
BY Hurvitz & Rose
ATTORNEYS 3,459,901
Patented Aug. 5, 1969

3,459,901

MAGNETIC TAPE EDITING MACHINE

James N. Cooper, Hyattsville, Md., assignor of one-third to Hyman Hurvitz, Washington, D.C.

Filed Oct. 22, 1965, Ser. No. 501,173
Int. Cl. G11b *5/48*
U.S. Cl. 179—100.2 7 Claims

ABSTRACT OF THE DISCLOSURE

A recorded magnetic tape is driven from a supply reel to a take up reel via a first storage bin, a first tape drive, a play head, a second tape drive, a second storage bin. The second drive forces the tape into the second bin, while it is being reviewed. If perfect, it is fed back into the first bin and then transcribed while being fed out of the first bin. If imperfect, deletions are made in the course of the latter transcription.

The present invention relates generally to tape editing devices for tape recorded material, and more particularly for devices for transferring recorded material from one tape to another, after review of the recorded material frame by frame, and deletion of undesired frames or parts of frames.

Briefly describing the invention, a recorded tape is assumed to exist, the material thereon being assumed to consist of successive frames. A frame may be a sentence, a phrase, a word or a paragraph. It is desired to transfer the recorded material to another tape, and in the process to delete sounds, words, phrases, syllables, or the like without disturbing the continuity of the material on the another tape. This process is referred to as editing.

In accordance with the invention, the first tape is driven from a supply reel to a take up reel via, in the order recited, a first bin, a first tape drive, a play head, a second tape drive, a second bin. The second tape drive pulls a frame of the tape through the first bin and pushes same into the second bin, while an operator listens to the recording on the tape. If the frame requires no editing it is pulled back into the first bin, and then pulled back into the second bin while its recorded matter is being transferred to the another tape.

If the frame requires deletion of material, that portion of the material preceding the portion requiring deletion is treated as a sub-frame and transferred to the another tape. The material to be deleted is now moved past a play head by hand and the remainder of the frame then transferred. No removal of tape sections is required, and the operation is largely controlled by manual and automatic switching.

It is an object of the invention to provide a system for editing magnetic tape in the process of transferring the recorded material from one tape to another, in successive frames.

The above and still further objects, features and advantages of the present invention will become apparent upon consideration of the following detailed description of one specific embodiment thereof, especially when taken in conjunction with the accompanying drawing, wherein:

The single figure of the drawings is a function block diagram of a preferred embodiment of the invention.

In the figure SR0 is a supply reel for a recorded tape T1. The tape proceeds through bin A, past copy capstan CP and associated pinch roller SP3, past play head P, past record capstan CR and associated pinch roller SP1, through bin B and to take up reel TR0. CR rotates clockwise and CP counter clockwise. Tape T1 is assumed to contain discrete frames of recorded material, for example only. Bin A contains a two state tape tension switch TTS–1, and bin B a like tape tension switch TTS–2.

To commence operation, the initial point of a frame is placed upstream of play head P, and reels SR0 and TR0 are manually actuated to tauten the tape T1, as indicated by lighting of lamps L1 and L2, for which energizing circuits are completed when the tape is taut.

Switch PS is closed, completing a circuit for solenoid S1, which pulls up SP1 against capstan CR and pulls tape T1 from reel SR0 and pushes the tape into bin B. Head P is connected via play amplifier PA to headphones H, and the editor listens and releases PS when the frame is terminated. If he overshoots he closes switch BS momentarily to energize solenoid S3, forcing pinch roller SP3 against capstan CP and feeding a bit of tape back to bin A, following which reel SR0 may be manually manipulated until TTS–1 is again taut. The frame now extends from play head P to within bin B.

Assuming the frame requires no editing, switch BS is now closed, backing up the tape from bin B to bin A, until TTS–2 becomes taut. The circuit 10 for back up solenoid S3 extends through TTS–3, and is broken when TTS–2 is in taut position. Therefore, the frame is now positioned with its initial point at head P and the remainder stored in bin A. The manuever is facilitated by counter C1, which is driven additively by SP1 and subtractively by SP3, and which should now read zero.

Record switch RS is now momentarily closed, providing an energizing circuit for relay RR from + terminal 11, line 12, TTS–1 to ground, and via line 13 to clutch solenoid CS1, which causes drive of reel TRO. When the relay RR pulls in, a hold circuit is formed at contacts RR1, from + terminal 15. A further energizing circuit extends from terminal 15, contacts RR2, line 17 to S1. Tape is now pulled from bin A past head P and through bin B into reel TR0. The process terminates when switching of TTS–1 deenergizes relay RR, i.e. when tape in bin A becomes taut.

Concurrently, solenoid S2 is energized via line 18, from terminal 15, clean tape is run by capstan CR and punch roller SP2, from supply reel SRC to take up reel TRC. At this time head P is connected through play amplifier PA, line 20, contacts RR3, line 21, and record amplifier RA to record head R and erase head E, and the transmitted material is recorded on tape T2. The record operation terminates automatically when the frame terminates.

If the frame has a portion to be deleted, this portion may occur at beginning, end or middle. If in the middle, the frame is treated as two frames so that the portion to be deleted always occurs at the end or the beginning of a frame. If at the beginning the objectionable portion is maneuvered past the head P before record takes place. If at the end the entire tape is positioned backwardly, enough that the record operation will terminate just as the objectionable portion reaches the play head.

For some uses of the device, as in preparing language training tapes control signals are required on a second track of tape T2. These can be inserted from signal amplifier SA, which can be connected to record head R via switch 25, concurrently with voice recording.

At times it is required to feed the tapes by precisely predetermined amounts. Source of single pulses of lengths .250, .500, .750, 1.0 second are provided at 30, 31, 32, 33. These can be applied at will to any of lines 35, 36, 37 by switch 40. Line 35 controls S3, line 36 controls S1 and line 37 controls S2 if switch 41 is in its dotted position.

Operation of switches 40 enables the operator to insert an accurately predetermined space between frames of tape T2, say one half second long, or to feed tape T forward or back in small increments. Counter C1 helps to judge the lengths of the latter increments.

Rewind of tape T1 is accomplished by transiently closing contacts 50, which energizes relay 51. The latter is self-locking and maintains a circuit for clutch solenoid CS2 until the hold circuit is broken by TTS–2, as a tape end passes out of bin B1, by opening circuit 53 to ground.

It may be noted that the recorder of the system can be a completely separate recorder, operated from the "play and delete" portion of the system. Advantage accrues, however, in having a unified device, in that facilities in the two sections of the device can have duplicate functions, and because play and record heads and amplifiers can be adjusted to have precisely complementary characteristics.

I claim:

1. A tape editing and reviewing device comprising a first bin, a second bin, means for reproducing and reviewing a frame of recorded material on a first tape while pulling the reproduced frame through said first bin into said second bin, means for at will transferring precisely said reproduced tape back from said second bin to said first bin, a recorder for recording material reproduced from said first tape onto a second tape, means for at will transferring precisely said frame of said first tape from said first bin to said second bin while reproducing the frame being so transferred to provide a reviewed signal, means transferring said reviewed signal to said recorder for recording thereby, a taut tape detector operatively associated with said first bin, and means for automatically terminating operation of said second means for at will transferring and of said means for recording in response to a taut tape condition in said first bin as sensed by said taut tape detector.

2. A tape editing device, comprising a supply reel for an original tape, a take up reel for said original tape, a first bin, a play head, a second bin, said original tape extending from said supply reel, through said first bin, past said play head, through said second bin, and to said take up reel, means for storing a length of tape taken from said supply reel in said first bin, a first tape drive mechanism located intermediate said first bin and said play head for pulling all of said stored tape in said second bin, from said second bin and pushing all of said tape into said first bin, a second tape drive mechanism located between said play head and said second bin for at will pulling all of said tape in said first bin from said first bin and pushing all of said tape into said second bin.

3. The combination according to claim 2 wherein said last means includes a tape tension switch in said first bin operative to a first condition only when said tape is taut in said first bin, and means responsive to said switch in said first condition for disabling said second tape drive mechanism.

4. The combination according to claim 3, wherein is further provided a tape recorder having a record head for recording on a second tape, means connecting said play head at will to said record head, a third tape drive mechanism for said second tape, means for actuating said third tape drive mechanism and said second tape drive mechanism concurrently at will, and means responsive to said switch in said first condition for disabling said third tape drive mechanism.

5. The combination according to claim 2, wherein is provided switch means for only in alternation rendering said first and second tape drive mechanisms operative.

6. The combination according to claim 2, wherein is further a first tape tension switch in said first bin, said tape tension switch being operative to a first condition only in response to taut tape in said first bin, and having a second condition while said tape is slack in said first bin, a second tape tension switch is said second bin and operative to a first condition only in response to taut tape in said second bin and having a second condition while said tape is slack in said second bin, means responsive to said first switch in said first condition and said second switch in said second condition for terminating operation of said second tape drive mechanism, and means responsive to said second switch in said first condition and said first switch in said second condition for terminating operation of said first tape drive mechanism.

7. A tape editing system, comprising a master tape supply reel, a master tape take up reel, a first storage bin, a play head, a second storage bin, said storage bins and play head being located in the order stated between said supply reel and said take up reel, means for feeding a length of tape from said supply reel into said first bin, means including first tape tension switch in said first bin for feeding precisely said length of tape from said first bin to said second bin while reviewing the material recorded via said play head, and noting the location of undesired material on said tape, means including a tape tension switch in said second bin for feeding back precisely said length of tape from said second bin to said first bin, means including said first tape tension switch for thereafter re-feeding precisely said length of tape from said first bin to said second bin while recording the material on said length of tape less said undesired material on a copy tape, and means for removing the copied length of tape from said second bin to said master tape take up reel.

References Cited

UNITED STATES PATENTS

| | | | |
|---|---|---|---|
| 2,988,604 | 6/1961 | Nye | 179—100.2 |
| 3,059,870 | 10/1962 | Hall et al. | 179—100.2 |
| 3,295,853 | 1/1967 | Cheng | 179—100.2 |
| 3,298,006 | 1/1967 | Milenkovic et al. | 179—100.2 |

FOREIGN PATENTS

| | | |
|---|---|---|
| 685,032 | 12/1952 | Great Britain. |

BERNARD KONICK, Primary Examiner

J. P. MULLINS, Assistant Examiner